Patented June 14, 1932

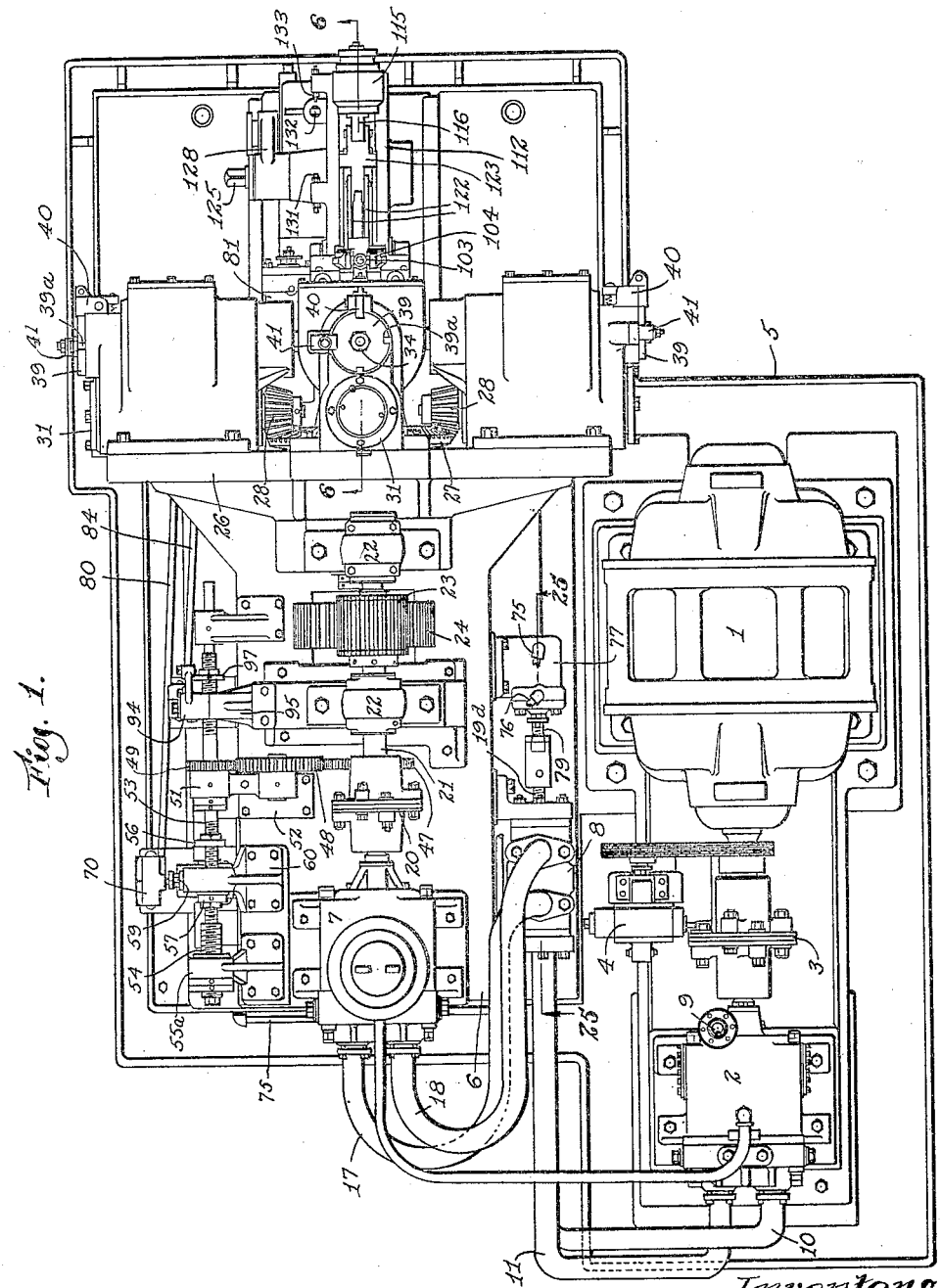

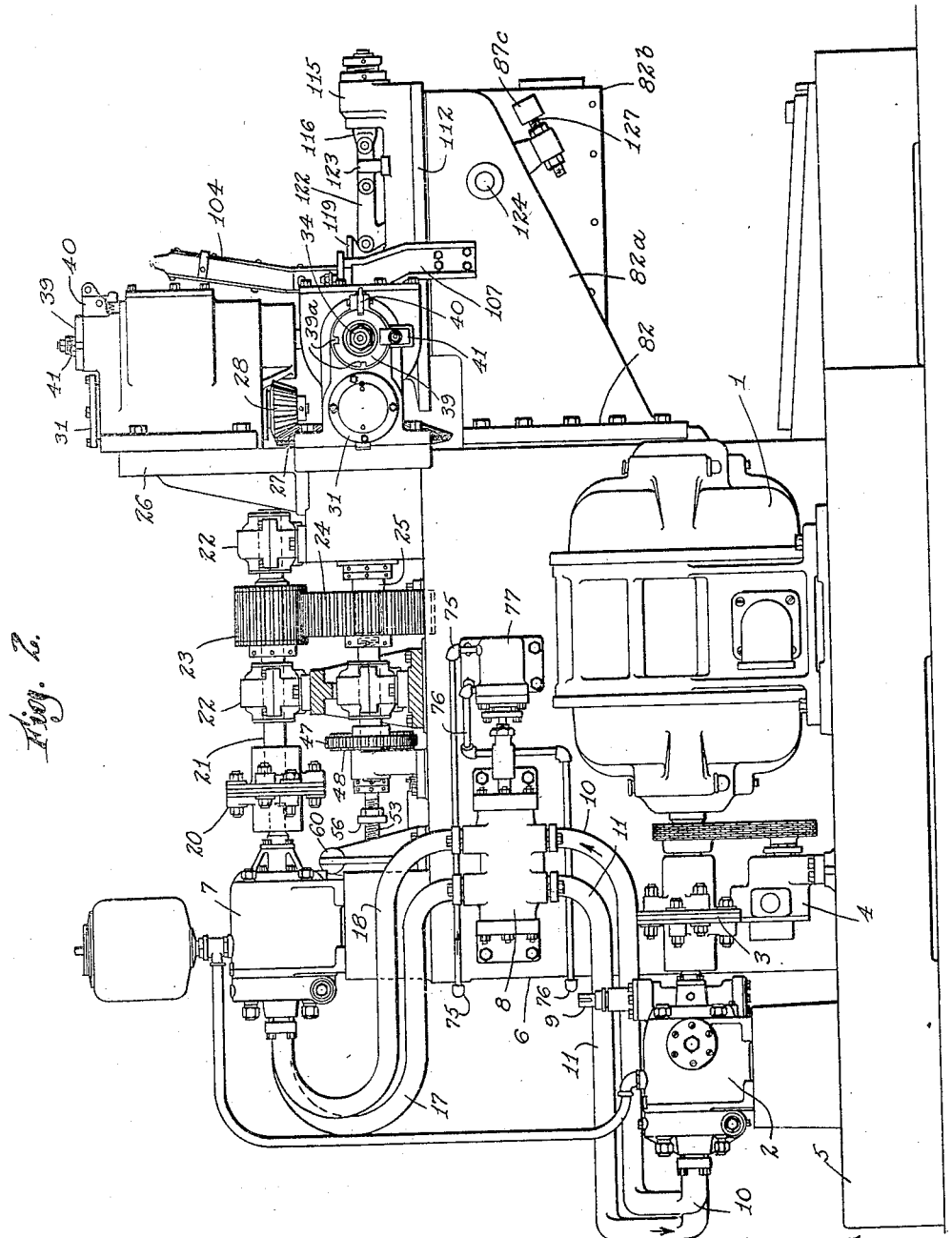

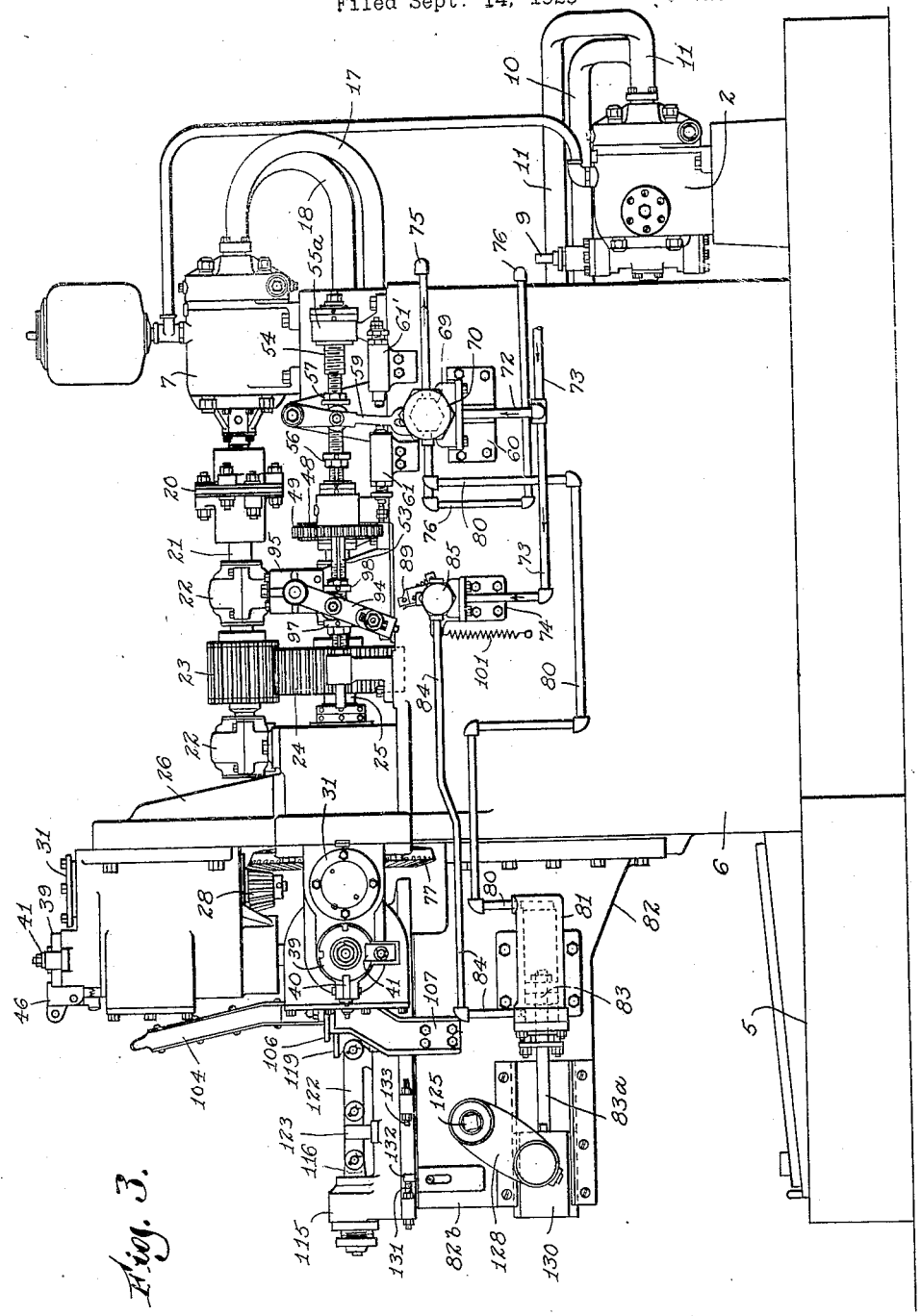

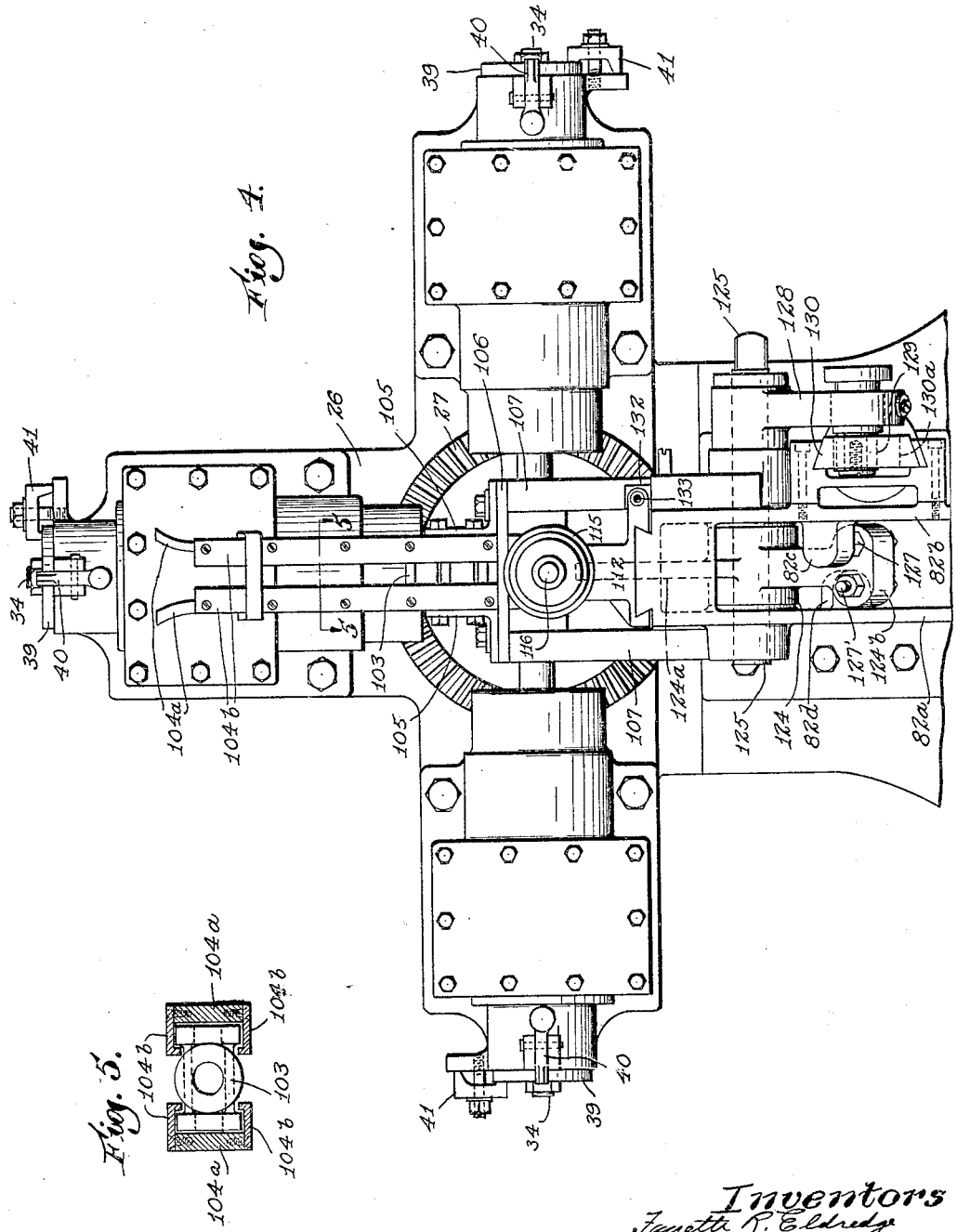

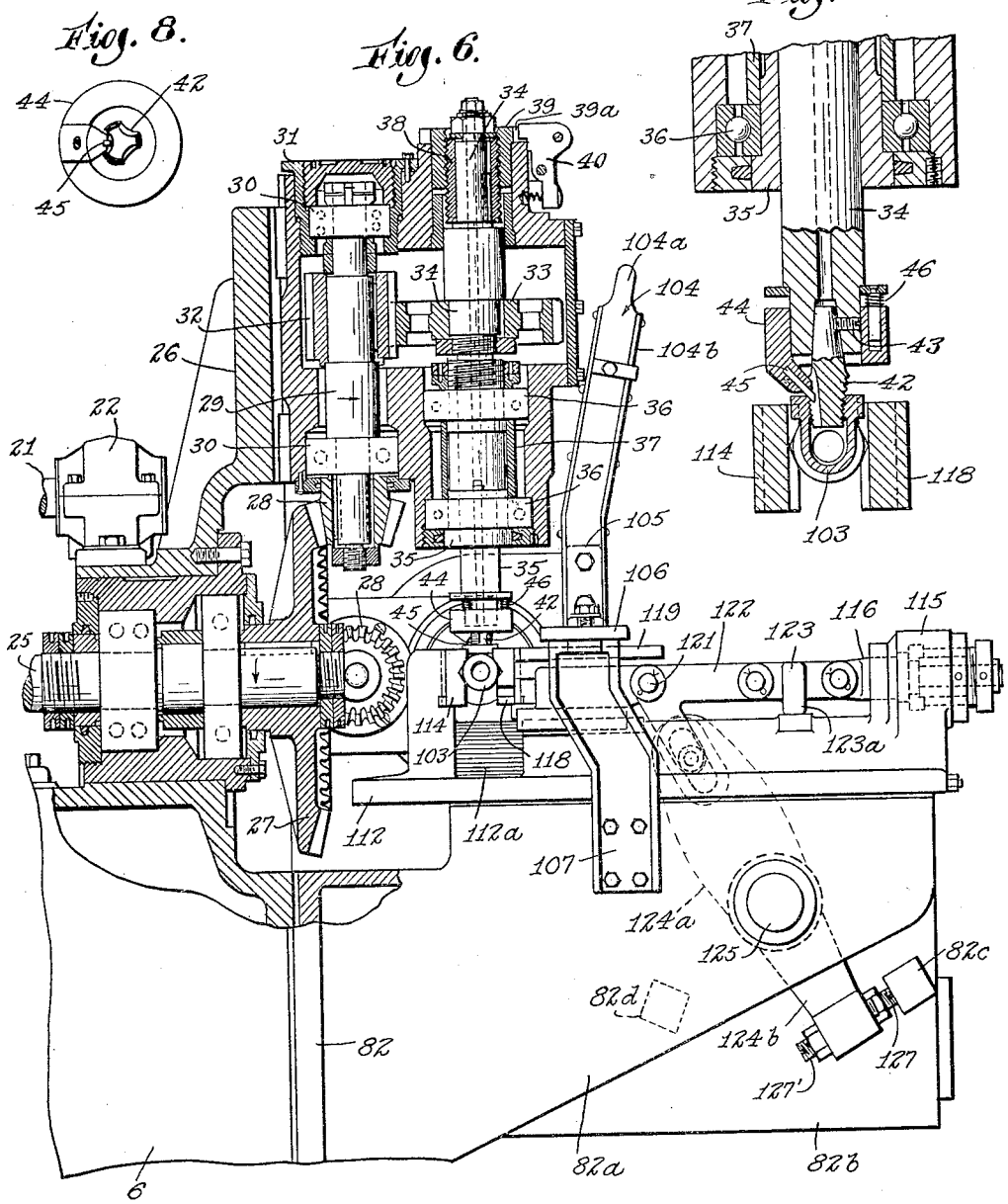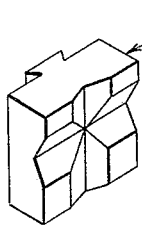

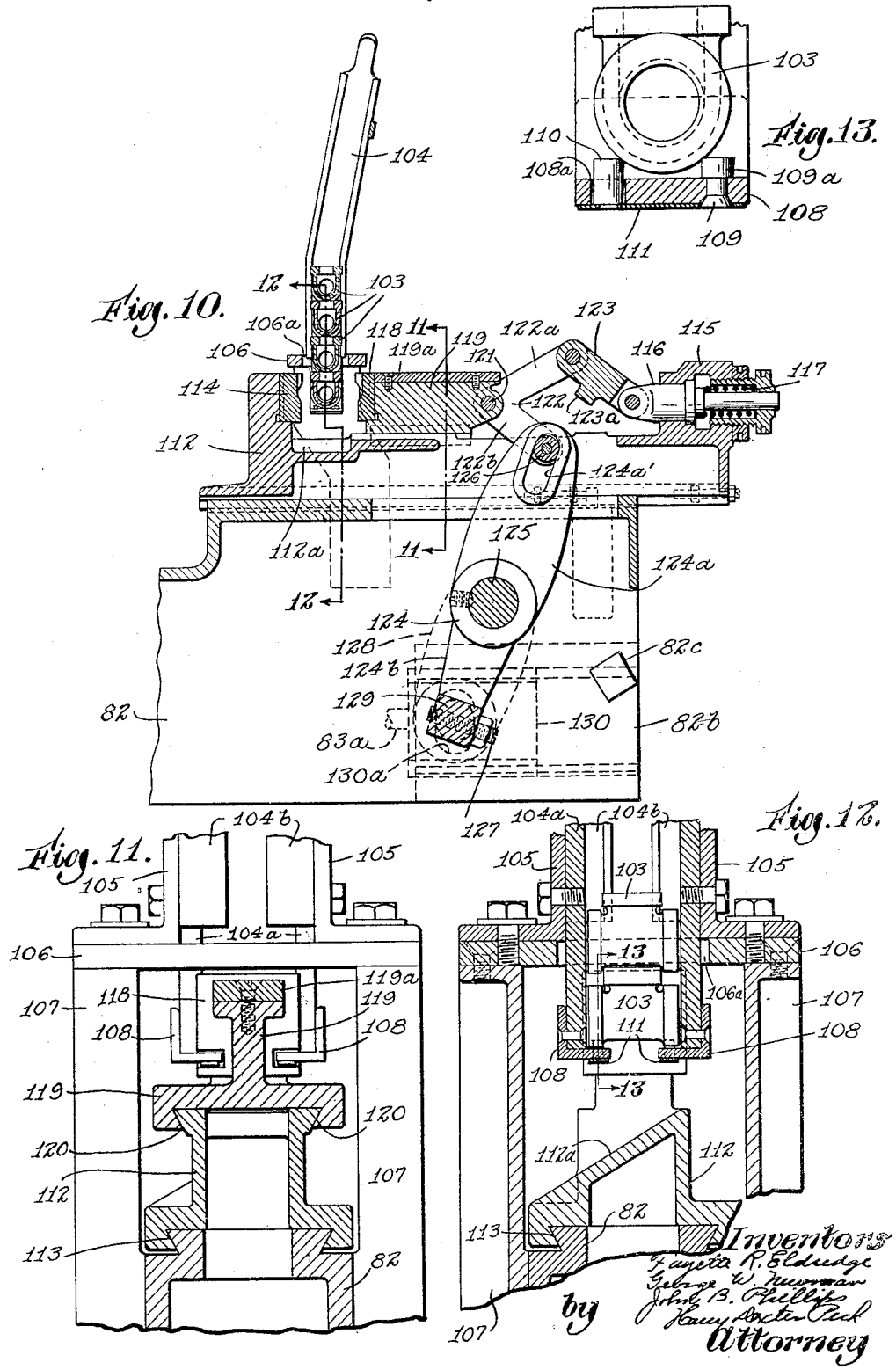

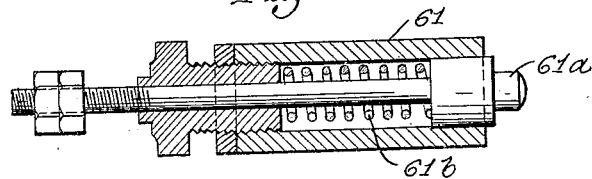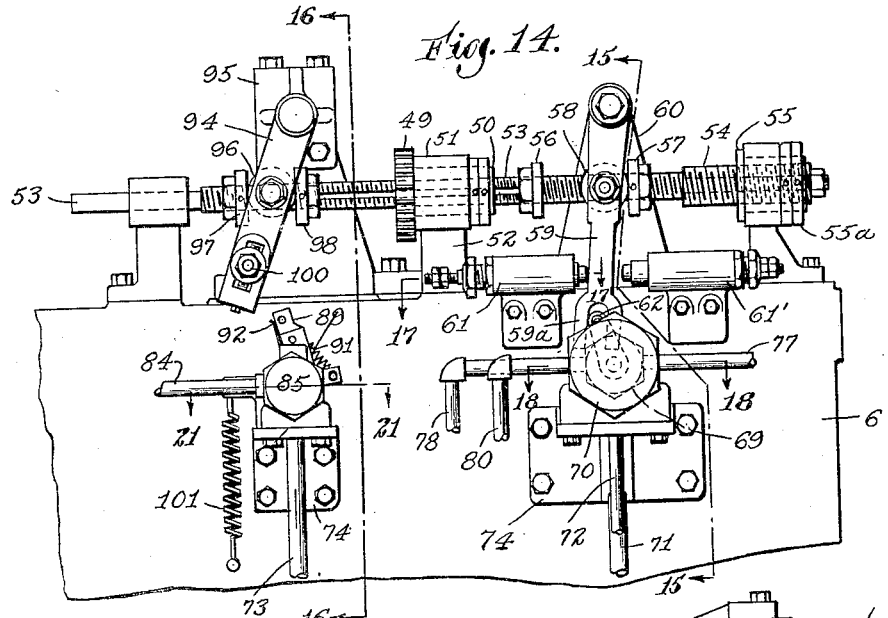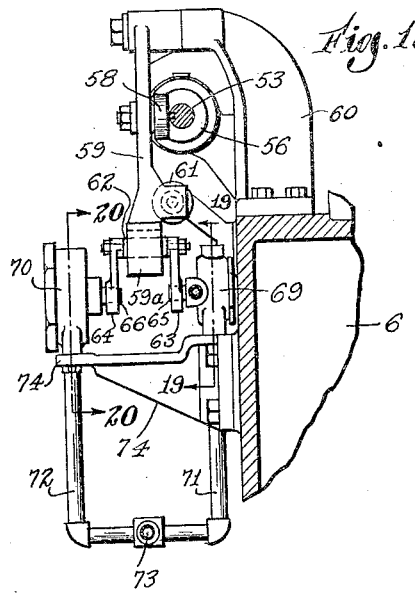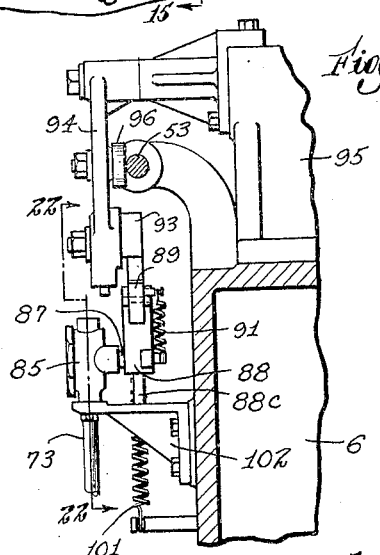

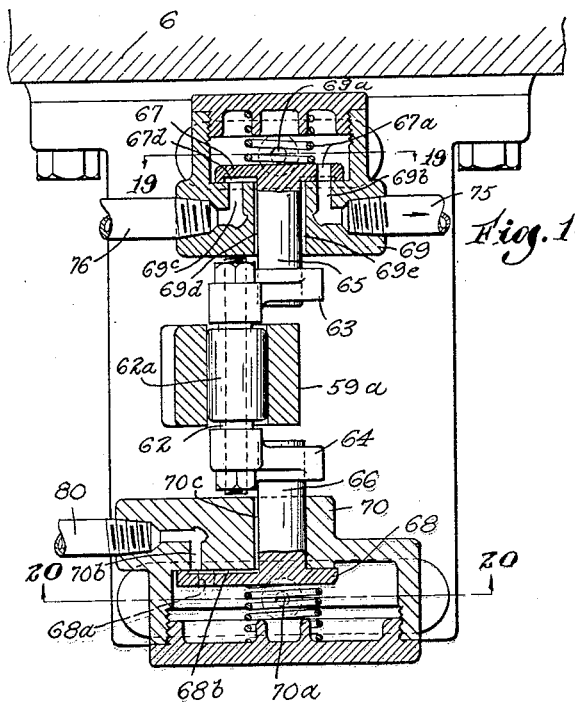
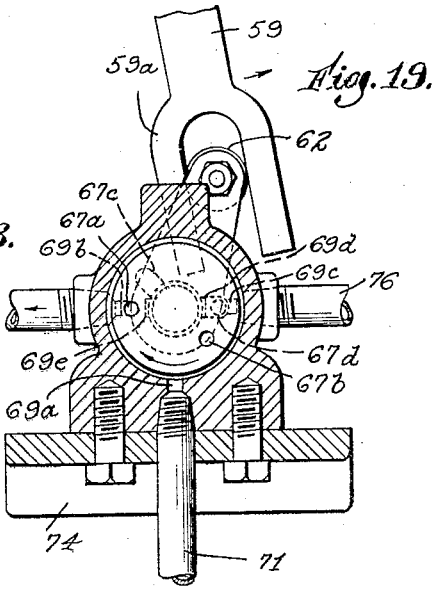
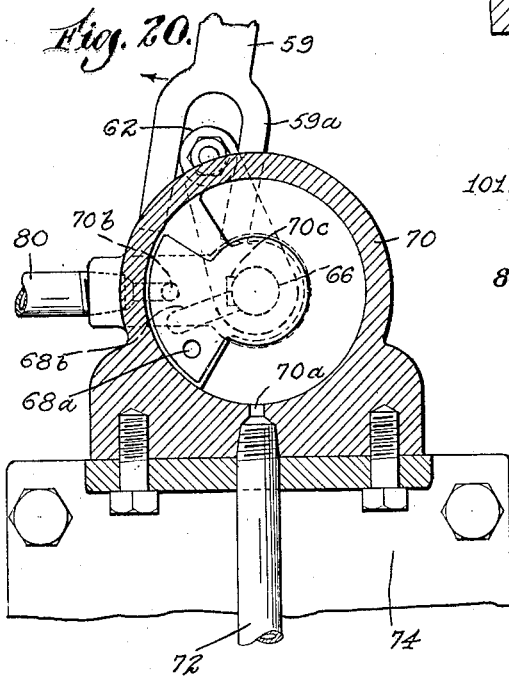
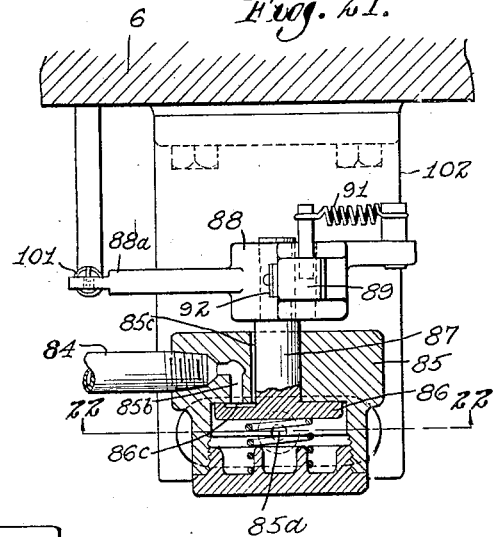

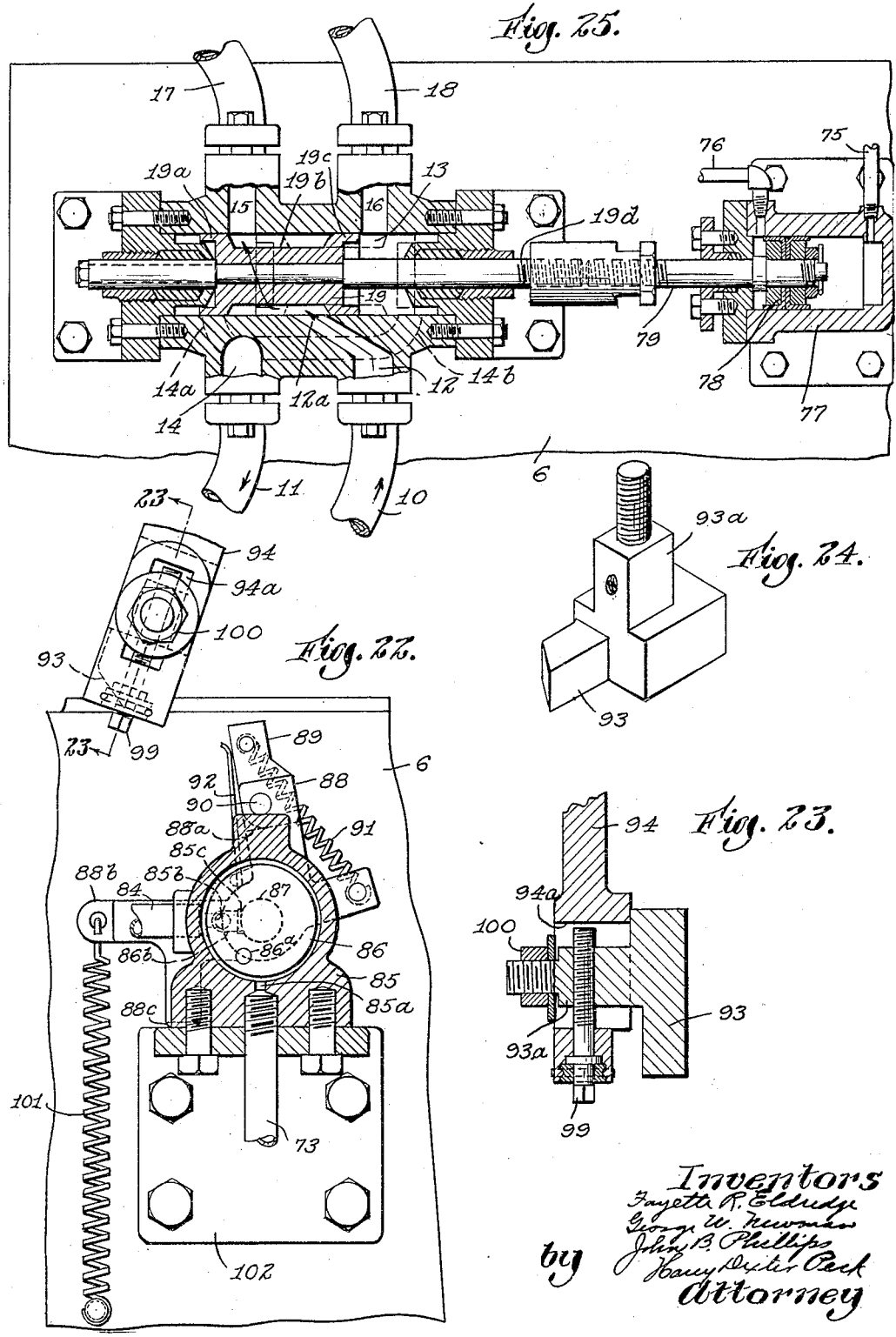

1,862,668

UNITED STATES PATENT OFFICE

FAYETTE R. ELDREDGE, OF PROVIDENCE, GEORGE W. NEWMAN, OF NORWOOD, AND JOHN B. PHILLIPS, OF RIVERVIEW, RHODE ISLAND; MILDRED C. NEWMAN, ADMINISTRATRIX OF SAID GEORGE W. NEWMAN, DECEASED; ASSIGNORS TO GENERAL FIRE EXTINGUISHER COMPANY, OF PROVIDENCE, RHODE ISLAND, A CORPORATION OF DELAWARE

METAL CUTTING MACHINE

Application filed September 14, 1929. Serial No. 392,536.

This invention relates to metal cutting machines. More especially it has to do with improved driving means for such machines and the automatic control thereof. Although hereinafter particularly described in its application to a tapping machine, the invention is not so limited for its principles may be incorporated in boring, drilling, reaming, counterboring and lapping machines or the like.

Heretofore, so far as we are aware, the driving mechanism of metal cutting machines has comprised a clutch of some form or other together with either belts and pulleys or gears for transmitting the power. Because of this the slow speed at which these machines could be operated has been determined, in part at least, by the ability of the clutch to withstand the sudden reversals of motion which must occur in such a machine, and where belts have been employed the danger of slippage has been also always present. While this slow speed has always been objectionable it is particularly so today when high speed tools are available and it is especially desirable to increase the operative speed of the machine as a whole to match that at which these tools can safely cut. To this end the present invention is directed, it being a general purpose of the invention to provide driving means and control means therefor which require no changing of belts, pulleys or gears but give a range of an infinite number of operating speeds from zero to a maximum that is far beyond that at which any known clutches or belts can be safely operated.

The primary object of the invention is the elimination of any clutch in the driving train and the provision of a power transmitting device which is unfailingly reliable and yet amply flexible to accommodate itself to the frequent and sudden reversals of the machine. It is a further object to provide an automatic control for this device and for the feeding mechanism and to synchronize these controls so that the latter mechanism feeds the work into cutting position as the cutting stroke begins, holds the work there while the cutting tool is entering and leaving it, and then while the tool continues its withdrawal stroke, releases the work and moves into position to engage new work. Other objects and features of the invention will be recognized as the description develops.

The preferred means by which the objects and the features of this invention are accomplished are illustrated in the accompanying drawings of a multi-spindle machine, any or all of which can be used simultaneously for boring, turning, reaming and for either outside or inside threading depending upon whether a die or tap is carried at the operating end of a spindle. As here shown the spindles are arranged with one vertical and with two horizontal, but this is merely illustrative and it is to be understood that the head of the machine could be designed so that the spindles could be permanently in any desired position angularly or could be adjusted to accommodate any irregular work to be operated upon.

As herein particularly shown, the illustrated machine is intended for use in making threaded pipe, tube and rod fittings, T's, elbows, couplings, bends, unions, railing fittings etc. Accordingly each spindle is shown as carrying a tap. The several spindles are driven by suitable gearing from a drive shaft which is directly coupled to the driven member or motor of a fluid variable speed unit. This motor is physically separated from the driving member or generator of the unit, but is operatively connected therewith through an intermediate valve mechanism. The latter determines the direction of flow of the fluid medium through the motor and by so doing governs the direction of its rotation and that of the main drive shaft. The fluid generator is driven by some suitable prime mover such as an oil, steam or air engine, turbine, or an electric motor as shown. It is to be understood, however, that the scope of the invention is not limited to an automatically reversible fluid unit but is to be deemed to cover the application to a metal cutting machine of any driving means whose direction of rotation can be reversed in accordance with the principle of this invention.

The intermediate fluid valve mechanism may be shifted manually but it is a feature of this invention to provide automatic control mechanism for doing so which acts in synchronism with the spindles. This control mechanism may be actuated by fluid such as oil, water or steam or air, the latter being referred to herein as representative of any suitable operating fluid.

When the spindles approach their outermost positions the control mechanism simultaneously affects the reversal of their movement and also the operation of the work feeding device to move the work into position to be cut. When the cutting operation is completed the movement of the spindles is again reversed but the return travel of the feeding device is delayed until the cutting tools have been withdrawn from the completed work. When this is accomplished the feeding device releases the finished work and moves to position where it receives a new charge of work from the supply magazine or from the hand of an operative.

It is intended that the patent shall cover by suitable expression in the appended claims, whatever features of patentable novelty exist in the invention disclosed.

In the accompanying drawings:

Figure 1 is a plan of a tapping machine embodying the invention;

Figure 2 is an elevation viewed from the left of the machine;

Figure 3 is an elevation as seen from the right;

Figure 4 is a front elevation of the upper portion of the machine;

Figure 5 is a horizontal section through the magazine, taken on line 5—5 of Figure 4;

Figure 6 is an elevation of the magazine and work feeding means, with the portion of the head containing the vertical tap shown in section as on line 6—6 of Figure 1;

Figure 7 is another vertical section, on larger scale, taken on line 6—6 of Figure 1, showing details;

Figure 8 is a bottom plan view of a tap;

Figure 9 is a perspective of a work clamping jaw;

Figure 10 is a vertical section taken on line 6—6 of Figure 1, of the work feeding means;

Figures 11 and 12 are vertical sections taken on lines 11—11 and 12—12 respectively of Figure 10;

Figure 13 is a vertical section on line 13— 13 of Figure 12, the T being shown in elevation;

Figure 14 is an elevation of the air valves and actuating means therefor;

Figures 15 and 16 are vertical sections on lines 15—15 and 16—16 respectively, of Figure 14;

Figure 17 is a vertical section, as on line 17—17 of Figure 14, of a lever centering device;

Figure 18 is a horizontal section on line 18—18 of Figure 14;

Figure 19 is a vertical section as on lines 19—19 of Figures 15 and 18;

Figure 20 is a vertical section as on lines 20—20 of Figures 15 and 18;

Figure 21 is a horizontal section on line 21—21 of Figure 14;

Figure 22 is a vertical section as on lines 22—22 of Figures 16 and 21;

Figure 23 is a section taken on line 23—23 of Figure 22;

Figure 24 is a perspective of the adjustable lever pawl; and

Figure 25 is a vertical section of the hydraulic control mechanism taken on line 25—25 of Figure 1.

Referring more particularly to the drawings, the several figures, except Figures 10—13, depict the various parts of the machine in their respective positions just as the cutting stroke of the tools has ended and the return stroke is about to begin. At this moment all parts are stationary except the constant speed electric motor 1 and the generator or driving member 2 of the fluid variable speed unit to which the electric motor is directly connected through the flexible coupling 3. These elements, together with a feed pump 4 for supplying lubrication to the work, are mounted on the base 5 beside the bed 6.

The fluid control mechanism

For descriptive purposes only, the fluid variable speed unit here shown is of the type disclosed in the Williams Patent #1,539,616 of May 26, 1925; but it is a feature of the present invention to separate the driving member 2 and driven member 7 of this unit and transmit the hydraulic medium, preferably oil, from one to the other through a control valve 8 mounted on the left side of the bed 6. The pistons (not shown) of the driving member or generator 2 rotate at constant speed and their angular adjustment is so set by the adjustment screw 9 that the oil delivered by them to the pistons (also not shown) of the driven member or motor 7 causes the latter, when in motion, to rotate at a speed which will effect the cutting speed desired.

The direction of rotation of the motor 7 is determined by the direction of flow of the fluid through it and this in turn is determined by the control valve 8. Fluid is constantly delivered from the generator through pipe 10 and returned thereto through pipe 11. These lead to the underside of the control valve 8 (see Figure 2). The former or delivery pipe 10 connects with a single port 12 (see Figure 25), which opens centrally of the cylinder 13, and the latter or return pipe 11 connects with a port 14 having double openings 14a and 14b, one near each end of the cylinder 13. In the upper wall of the cylinder are two more port openings 15 and 16 connecting respectively with pipes 17 and 18 which lead to motor 7. A flanged piston valve 19 reciprocates in the cylinder 13 from one end to the other. When at the left end, as shown in Figure 25, the left flanged end 19a of the piston valve closes the lower return port opening 14a, a circumferential groove 19b on the piston valve overlaps both the delivery port opening 12a and the port opening 15, and the right flanged end 19c of the piston cuts off the groove 19b from the right end of the cylinder which is open both to the upper port 16 and to the return port opening 14b. Consequently with the valve set as shown in full lines, the flow of fluid is from the delivery pipe 10 through port 12, circumferential groove 19b, port 15 and pipe 17 to the motor, from whence it returns via pipe 18, port 16, cylinder 13, port 14, and return pipe 11 to the generator. This direction of flow causes the motor to rotate in counter-clockwise direction, as viewed from the front of the machine, which is its direction of rotation while the tool is being withdrawn.

The reversal of rotation of the motor 7 is accomplished when the piston valve 19 is shifted to the other end of the cylinder 13. Then the groove 19b overlaps both the port opening 12a and the port 16, the return port opening 14b is closed by the flanged-end 19c, and the port 15 is open through the left end of cylinder 13 to the return port opening 14a. Fluid accordingly flows from pipe 10 through port 12, groove 19b, port 16 and pipe 18 to the motor 7 and returns through pipe 17, port 15, cylinder 13, port 14 and pipe 11 to the generator 2. The consequent direction of rotation of the motor 7 is its direction when the taps are making their cutting stroke.

By thus separating the driving and driven elements of the hydraulic variable speed device and incorporating the control valve 8 intermediate thereof, the generator need be set but once for a definite rotative speed of the motor and can thereafter be left undisturbed to rotate continuously with the electric drive motor.

Another advantage gained from the physical separation of the hydraulic members is that it enables the electric motor and generator to be mounted on the most firm part of the machine, the base, while permitting the motor 7 to be positioned on the bed of the machine where it can conveniently be coupled direct to the drive shaft. This arrangement materially lessens the number of power transmitting parts that would otherwise be required if the hydraulic units were not separated as here disclosed.

Tool driving mechanism

As stated, the motor 7 is connected directly by the flexible coupling 20 with the main drive shaft 21 which is journaled in bearings 22 and carries a gear 23 on a head shaft 25 that extends through the lower rear portion of the head 26 and carries the large bevel gear 27. The latter simultaneously drives three bevel pinions 28, through each of which the power is transmitted to one of the tool-spindles. Since the details of each spindle assembly are alike, the description will be limited to the vertical one of the three, as illustrated in Figures 6–8.

The bevel pinion 28 is keyed to the pinion shaft 29 which is journalled in ball bearings 30 and may be set toward or from the axis of the large gear 27 by means of the adjusting sleeve 31. On this shaft is secured a gear 32 which has teeth wide enough to accommodate the reciprocating movement of its intermeshing gear 33 on the work spindle 34. This spindle extends through a sleeve 35 which rotates on the ball bearings 36 (between which is the spacing collar 37) but has no linear travel. The work spindle rotates with and slides along this sleeve. At the upper end of the spindle is fastened an externally threaded sleeve 38 which engages a sleeve nut 39 normally held against rotation by the detent 40 engaging one of its peripheral notches 39a. The rotation of the spindle and its threaded sleeve 38 within the non-rotating nut 39 causes the spindle to move linearly in one direction or the other according to its direction of rotation. The pitch of these threads is the same as that of the thread being cut, and when a thread of different pitch is to be cut the nut 39 and sleeve 38 must be changed accordingly. The path of linear travel of the tool can be adjusted, should it become necessary to do so as when the tool becomes worn or renewed, by loosening a safety clamp 41, (see Figure 4) withdrawing the detent 40, and turning the sleeve nut 39 in or out to bring another of its notches 39a in line to receive the detent. This simultaneously moves the spindle along its axis and thus determines the path of linear travel of the tool into or out of the work.

The safety clamp 41 is provided in order to prevent destruction of the tool or other moving parts. Wherever sufficient resistance is encountered by the tool to prevent its continued travel on the working stroke, the reaction transmitted to the sleeve nut 39 tends to rotate the latter. Being held against rotation, by the detent 40, the rotative tendency of the sleeve nut is accordingly transformed into a tendency to move linearly along the spindle 38. This imposes a breaking pressure on the relatively weak clamp 41 which gives way and allows the sleeve nut to travel along the sleeve 38 until clear of the detent. During this travel of the sleeve nut, there is no linear movement of the spindle, and when the former is free from the detent, both merely rotate together.

The lower end of the spindle 34 is interiorly tapered (see Figure 7) to receive the shank of the tool, here shown as a tap 42. The grip on the tap may be augmented by the set screw 43. Mounted exteriorly on the spindle is a holder 44 which carries a chamfering cutter 45 positioned in a hollow between the cutting portions of the tap (see also Figure 8). As the end of the tapping cut approaches, this chamfering cutter engages the work, at first yieldingly while the cushioning springs 46 are being compressed, and then unyieldingly while a bevel is cut on the work at the entrance of the tapped hole.

*Fluid valve control mechanism*

Turning now to the control mechanism, (see Figures 1, 2 and 3) the head shaft 25 carries near its rear end a gear 47 which meshes with an idler gear 48 and thus indirectly with a second gear 49 attached to a sleeve 50 (see Figure 14) which is journaled in the bearing 51 of support 52 and can not move axially. It is slidably keyed to the threaded shaft 53 which at its rear end has an enlarged threaded portion 54 that engages a sleeve nut 55 held non-rotatably in support 55a. The pitch of the threads on this enlarged portion 54 is such that a desired linear travel of shaft 53 will occur which bears a predetermined relation to the linear travel of the tool. The main portion of shaft 53 is also threaded and on that portion of it which plays between supports 52 and 55 are two pairs of nuts 56 and 57 which serve as dogs to engage a roller 58 mounted on a lever 59 fulcrumed on the bracket support 60. This lever extends downward between two centering devices 61 and 61' and at its lower end 59a is forked to engage a roller 62a on a shaft 62 (see Figures 15 and 18) which rigidly joins two cranks 63 and 64 carried respectively by the spindles 65 and 66 of two plate valves 67 and 68. The casings 69 and 70 of these valves are mounted on the bracket support 74 on the right side of bed 6 and have inlet ports 69a and 70a respectively which connect by pipes 71 and 72 with a supply pipe 73 leading from a source of fluid under pressure, hereinafter referred to as air.

The casing 69 of valve 67 (see Figures 18 and 19) has also two ports 69b and 69c, connecting with pipes 75 and 76 respectively, and two outlet ports 69d and 69e to atmosphere, these latter ports being grooves extending along the bearing of the spindle 65.

The plate valve 67 has two holes 67a and 67b of the same size as the port openings 69b and 69c and also two grooves 67d and 67e on its face, the former of which extends outward from the spindle 65 so as to be able to overlap the ports 69c and 69d, and the latter of which can similarly connect ports 69b and 69e.

Recalling that the positions of the various parts of the machine are those which occur at the end of the cutting stroke of the tool, it is clear that due to the linear travel of the screw shaft 53, the lever 59 is at the end of its forward swing having been moved thereto by the nut dog 57. This movement of the lever has rotated the crank arm 63, (and likewise the crank arm 64 as will later be referred to) spindle 65 and plate valve 67 until the hole 67a in the latter is in register with the outlet port 69b of the casing. (See Figure 19.) At the same time the groove 67d of the plate valve is in register with the ports 69c and 69d. Accordingly, air will be forced from the supply pipe 73 through pipe 71, port 69a, the chamber of casing 69, hole 67a and port 69b into pipe 75. And air may pass from pipe 76 through port 69c, groove 67d, and port 69d to atmosphere.

These pipes 75 and 76 connect the valve casing 69 with a cylinder 77 mounted on the left side of the bed 6 (see Figures 2, 3 and 25). In this cylinder is a piston 78 whose rod 79 is connected with rod 19d of the piston valve 19 which, as previously described, controls the direction of flow of fluid to the hydraulic motor 7. As the plate valve 67 is swung to the position shown in Figure 19, the air enters pipe 75 and flows to the forward end of cylinder 77 to act upon the piston 78 therein which, during the cutting stroke of the tap, was at the forward end. This air force accordingly moves piston 78 to its rearward position shown, the air in that end of the cylinder having escaped through pipe 76, port 69c, groove 67d, and port 69d to atmosphere. Upon the shifting of the piston 78, the hydraulic control valve 19 is also shifted to its illustrated position to change the direction of travel of the oil. The situation illustrated in the drawings is that existing just after the piston 78 and valve 19 have been thus shifted, with the motor 7 momentarily idle and just about to begin its rotations which will effect the return stroke of the machine.

During this return stroke the threaded shaft 53 travels toward the right in Figure 14, carrying with it the nut dog 57. The left centering device 61, which comprises a plunger 61a actuated by an encased spring 61b (see Figure 17), swings the lever 59 counter-clockwise keeping the roller 58 against the nut dog 57 until the lever brings up against the plunger of the right centering device 61'. The latter arrests the movement of the lever and with its companion device holds the lever vertical or in central position until later in the travel of the shaft 53, when the other nut dog 56 engages the roller 58 and pushes the lever further to the right. While the lever is thus held vertical, both the holes and the grooves of the plate valve 67 will be out of register with the ports of the casing 69, consequently the air in the cylinder 77 will be entrapped therein, holding the piston valve 19 in its illustrated position against any tendency of the oil to move it.

Toward the end of the return stroke, as the lever 59 is further swung by the nut dog 56, hole 67b of the plate valve will come over the port 69c and groove 67c will connect the port 69b with the outlet 69e. As a result air under pressure will pass from supply pipe 73 through pipe 71, port 69a, hole 67b, port 69c and pipe 76 to the rear end of cylinder 77 and act upon piston 78 to push it and the hydraulic control valve forward. The air ahead of piston 78 will escape via pipe 75, port 69b, groove 67c and port 69e to atmosphere. Thus the flow of oil to the motor 7 is again reversed in direction with consequent momentary stoppage of the tap followed immediately by its travel on its working stroke.

*Control mechanism for work feeding cylinder*

As previously noted, the shaft 62, whose roller 62a is engaged by lever 59, rigidly joins crank 63 with crank 64 so that the movements of the former just described are exactly like the movements of the latter. The crank 64 is mounted on spindle 66 of a plate valve 68 which is similar in all respects to plate 67, except that it is somewhat larger and has only one hole 68a, and one groove 68b. Likewise the casing 70 has its inlet port 70a, but only one other port 70b connecting with a pipe and only one outlet port 70c leading to atmosphere. The port 70b connects with pipe 80 that leads to the rear end of a cylinder 81 mounted on the right side of the work table 82 at the front of the machine. (See Figure 3.) This cylinder contains a piston 83 whose movements govern the work feeding mechanism to be hereinafter more particularly described.

Suffice it to say for the moment, that when the work is engaged by the tools the piston 83 must be in its forward position as shown and must remain there until the tools have been withdrawn from the work. Accordingly, when the lever 59 is swung to the left, as seen in Figures 3 and 20, air is neither admitted nor exhausted from the rear end of cylinder 81 through pipe 80 because both the hole 68a and the groove 68b are out of register with port 70b. As the lever 59 swings back to its vertical position, the groove 68b connects port 70b with exhaust port 70c and thus establishes an escape passage for the air in cylinder 81.

From the front end of this cylinder 81 a pipe 85 leads to a valve casing 85 (see Figures 3, 21 and 22) which has an inlet port 85a, a port 85b connecting with pipe 84, and an exhaust port 85c to atmosphere. Within the casing is a plate valve 86 like plate valve 68 having a single hole 86a and a groove 86b adapted to connect the port 85b with exhaust port 85c. On the spindle 87 is a crank arm 88 whose upper end has a flat bottomed slot 88a in which a pawl 89 rotatable on its pivot 90. The lower left corner of the pawl is rounded so that it may swing counter clockwise as seen in Figure 22 about this pivot. This flat portion of the pawl end is normally held against the flat bottom 88a of the slot and in the crank arm 88 by the coiled spring 91 and the lever spring 92, both of which are mounted with the pawl on the crank arm 88.

The rotatable pawl 89 is in the path of movement of a fixed pawl 93 on lever 94, (see Figure 14) which is fulcrumed on a bracket support 95 and carries a roller 96 that is between two pairs of nut dogs 97 and 98 on the threaded shaft 53. Both of these pairs of nut dogs are positioned close by the roller 96, so that the lever 94 is moved simultaneously with the shaft 53, there being no lost motion between them such as occurs between this shaft and the lever 59. The fixed pawl 93 is adjustable with respect to lever 94. (See Figure 23.) The latter has an axial slot 94a through which an arm 93a on the pawl extends, and an adjusting screw 99, held against axial movement in the end of the lever engages this arm 93a and enables a very fine setting of the pawl 93 to be made. When properly adjusted the pawl is locked in position by the clamp nut 100.

Having in mind that the positions of the parts illustrated are the positions just at the completion of the cutting stroke, it is obvious that the work being cut must remain stationary until the tool has been withdrawn. Accepting for the moment the statement that the piston 83 must be in its illustrated forward position when the work is engaged by the tool, the action of the two plate valves 68 and 86 which control this piston, can be readily followed. With the lever 59 in the position shown in Figures 3, 14 and 20, the plate valve 68 will be turned so that neither the hole 68a nor the groove 68b is in register with the port 70b. Consequently at such time no air will enter or leave the cylinder 81 via pipe 80. And neither will any air be introduced to the front end of cylinder 83 because the plate valve 86 will be in the position shown in Figure 22, with its groove 86b connecting the port 85b with the exhaust port 85c. This position of plate valve 86 is maintained during most of the operation of the machine, it being yieldingly held thus by the spring 101 which engages an arm 88b of the crank 88 with sufficient tension to normally keep the stop 88c against the bracket support 102. Consequently at the end of the cutting stroke, when the piston 79 is shifted to effect the reversal of rotation of the hydraulic motor 7, there will be no movement of the piston 83 and consequently no change in the position of the work feeding mechanism.

As the return or withdrawal stroke of the tool goes on, however, the lever 59 is brought to its vertical or central position, thus bringing the groove 68b (see Figure 20) in plate valve 68 over the port 70b. It will be recalled that this central position of lever 59 is maintained for a time by the centering devices 61 and 61' while the shaft 53 is traveling to the right and the nut dog 56 is approaching the lever 59. During this interval, lever 94 (see Figure 14) will have been swinging steadily to the right, as the nut dogs 97 and 38 continue to travel with shaft 53, and its fixed pawl 93 will have engaged pawl 89 on crank 88 and moved the latter clockwise. This movement of the crank soon brings the hole 86a (see Figure 22) in plate valve 86 over the port 85b leading to pipe 84. Air will begin to flow through this pipe to the head end of cylinder 81 and build up a pressure thrust on piston 83. By the time this thrust is great enough to move the piston, the tools will have traveled out of the work and the work feeding mechanism can safely be moved. Accordingly, the piston 83 is shifted rearward, the air ahead of it being forced along pipe 80 through port 70b, (see Figure 20) groove 68b and exhaust port 70c to atmosphere, it being understood that the lever 59 is still in central position with the plate valve 68 properly positioned to permit this escape of air. The arcuate movements of the fixed pawl 93 and the crank pawl 89 are so timed that they slip past one another almost simultaneously with the shifting of piston 83 to the rear end of cylinder 84, thus permitting spring 101 to rotate the plate valve 86 and bring the groove 86b thereof again in register with the port 85b. This enables the excess pressure in cylinder 84 to escape and leaves the vent passage for the head end of the cylinder open ready for the forward movement of the piston 83 to that end.

This forward movement occurs as the lever 59 is swung to the right in Figures 14 and 20 toward the end of the withdrawal stroke when shaft 53 has moved far enough to the right to bring nut dog 56 against the roller 58. Simultaneously with the positioning of plate valve 67 so as to admit air to the forward end of cylinder 77, as previously described, the plate valve 68 is positioned with its hole 68a over port 70b so as to admit air to the rear end of cylinder 81. This is a feature of the invention and brings about a synchronized action of the fluid control valve to start the tools inward on their cutting strokes, and of the work piston to shift the work into position ready to be acted upon by the tools.

By having the air valves which bring about these two results physically connected through the roller shaft 62, the desired identity of valve action is assured.

Following the simultaneous shifting of the two pistons 78 and 83, the shaft 53 beings its forward travel, swinging lever 94 to the left. Lever 59 will also be swung to the left under the action of centering device 61' until it is again in its central position, where it pauses until the lost motion between it and nut dog 57 is taken up. During that pause, the groove 68b of plate valve 68 connects port 70b and exhaust port 70c, thus permitting escape of the excess pressure in cylinder 81. As the lever 94 continues its left swing its pawl 83 again meets pawl 89 of the crank 88, but in this direction of movement the latter pawl 89 turns about its pivot 90 overcoming the resistance of the two springs 91 and 92 which return the pawl to its illustrated position as soon as the lever pawl 93 has slipped by. Thus the mechanism controlling plate valve 86 is reset ready for the next swing rearward of the lever 94.

Work feeding mechanism

The work being operated upon illustrated in the drawings is a pipe T 103. (See Figures 10, 12 and 13.) By changing the magazine and a few minor parts which grip the work, couplings, elbows and other fittings may be tapped on the machine. When only two threads need be cut in a fitting one of the taps is temporarily put out of commission by removing the safety clamp 41 and turning the sleeve nut 39 upward so that its notches 39a can not be engaged by the detent 40. But when a pipe T is being cut, as shown herein, all three taps are employed.

The magazine 104 comprises side bars 104a (see Figure 5) and flanged guide plates 104b which together form a trough or chute into which the T's 103 are fed with the head of the T horizontal and leg upstanding therefrom. The side bars 104a are attached by angle irons 105 to a bridge-piece 106 which is mounted on bracket supports 107 attached to the work table 82. These bars 104a extend below a hole 106a in the bridge-piece (see Figure 12) and at their lower ends have angle plates 108 upon which the lowermost T rests. These plates project inward toward one another just under the respective rims of the T. Near the front end of each angle plate 108 is a rivet 109 (see Figure 13) whose upset shank 109a serves as one rest for the T; and near the rear end of each plate is a hole 108a through which projects upward a stud 110 carried by a resilient bar 111 clamped to the plate by the rivet 109. As the T is forced rearward, or to the left as seen in Figure 13, the bars 111 yield allowing the studs 110 to be pushed downward and out of the way of the T.

A work carriage 112 is mounted on suitable dove-tailed slides 113 on the work table 82. At its rear or inner end the carriage has a fixed work holding jaw 114 (see Figures 9 and 10), and at its forward or outer end has a housing 115 which forms a bearing for a plunger 116 and its cushioning spring 117. Between the plunger 116 and the fixed inner jaw 114 is a slidable jaw 118. This is at the inner end of a jaw slide 119 which moves on dove-tail ways 120 on the top of the carriage 112. At the outer end of the jaw slide is the fulcrum pivot 121 of a pair of bell cranks 122, the upper arms 122a of which are pivotally connected by a link 123 to the plunger 116. The lower arms 122b of the bell crank are operatively connected to a lever 124 fulcrumed intermediate of its ends on a shaft 125 that extends through the depending plates 82a and 82b of the work table 82. (See Figures 4, 6 and 10.) The upper arm 124a of this lever has an elongated bearing 124a' for a roller 126 carried by the bell crank arms 122b. Between the plates 82a and 82b the lower arm 124b of the lever swings, its limit of swing being determined by the engagement of one adjustable stop screw 127 on the lever with a fixed stop 82c on one of the plates 82b, and its limit of swing in the opposite direction is determined by another adjustable stop screw 127' and a fixed stop 82d on the other plate 82a.

Outside of the plate 82b, the shaft 125 carries a crank 128 (see Figures 3 and 4) which has an offset roller 129 that plays in a vertical slot 130a (shown dotted in Figure 10) of a slide block 130. The latter is connected to the piston rod 83a of piston 83 previously described. (See Figure 3.) As the slide block 130 moves forward or backward with this piston it rotates the crank 128 and shaft 125 and thereby swings lever 124. When the work carriage is retracted or in its outer position with its various parts as shown in Figure 10, the first result that occurs upon the swinging of lever 124 counter-clockwise is a combined swinging of the bell cranks 122 and link 123 and a simultaneous movement of the slide block forward on the carriage 112 to bring its jaw 118 against the lowermost T in the magazine. This T is pushed forward, the studs 110 yielding as explained, until it brings up against the fixed jaw 114. This for the moment stops the travel of the jaw slide 119 with respect to the carriage and causes the latter as a whole to move inward on the table under the continued swing of lever 124. This inward travel of the carriage is arrested by the engagement of an adjustable screw 131 (see Figure 3) on the side of the carriage with a stop 132 removably secured to the plate 82b of the table. As the carriage slides rearward the top plate 119a of the slide block 119 comes under the next T and prevents it from falling until the carriage is returned. When the forward travel of the carriage is stopped the T is in position to be operated upon by the three taps, its head being in alignment with the two horizontal taps and its leg being under the vertical tool. This stoppage of the carriage occurs just before the end of the swing of lever 124 so that the remaining movement of this lever swings the bell cranks 122 and link 123 further downward, with the arms 122a and the link passing slightly beyond alignment until the stop lug 123a on the link rests on the carriage. This final movement of the bell cranks and links firmly locks the T between the jaws 114 and 118, any excess of pressure occasioned by the straightening of the toggle-like arms 122a and links 123 being absorbed by the cushioning spring 117 which permits the plunger 116 to yield outward.

The just described action of the work feeding mechanism occurs during the forward movement of piston 83, and as previously explained, is fully completed before the taps have moved sufficiently inward to engage the T. The latter is held firmly in place while the cutting operation is performed and also while the taps are being withdrawn from the threaded holes. Figure 6 shows the taps in the T at the end of the cutting stroke and ready to be withdrawn. As soon as the taps are clear, the lever 94 will actuate plate valve 68 to shift piston 83 forward and swing lever 124 to withdraw the work feeding mechanism. The first resulting movement is the swinging of bell cranks 122 upward about the pivot 121 with consequent upward swing of the link 123. This withdraws jaw 118 from the finished T which then drops downward onto the inclined surface 112a of the carriage which directs it sidewise into a box or other receptacle. The upward swing of the bell cranks 122 is soon arrested by the engagement of the roller 126 with the upper end of slot 124a' in lever 124, whereupon the continued swing of the latter causes the work carriage as a whole to move outward on the ways 113. The stop screw 127' is adjusted to stop the swing of the lever 124 simultaneously with the engagement of the adjusting screw 133 on the carriage with the stop 132, thus completely arresting the withdrawal movement of the feeding mechanism. As the jaw 118 moves from under the T in the magazine which has been resting on the top of the slide block 119 all the T's drop downward thus placing the lowermost T in position to be fed inward upon the next rearward movement of the carriage.

We claim:

1. A metal cutting machine having a tool arranged to be rotated in different directions and reciprocated to travel respectively into and out of work being cut; a source of power; means transmitting power from said source to said tool so as to effect the rotation and reciprocation thereof comprising a generator and a motor receiving power therefrom; control means for changing the direction of flow of power through said motor and thereby effecting change of direction of rotation and reciprocation of the tool; work feeding means movable to and from cutting position; and means operated by said power transmitting means for governing the actuation of said control means and the movement of said work feeding means to cutting position.

2. A metal cutting machine having a tool arranged to be rotated in different directions and reciprocated to travel respectively into and out of the work being cut; work holding means adapted to move the work to and from cutting position; and means controlling the movements of said tool and said work holding means comprising a valve whose movements govern the direction of rotation and reciprocation of said tool; a second valve whose opening effects the movement of the work to cutting position; a third valve whose opening effects the withdrawal of said work from cutting position and its discharge from the machine; and automatically operated mechanism arranged to move the first and second mentioned valves together to effect movement of the work to cutting position as the tool travels toward the work and then to effect travel of the tool from the work after the cutting is completed; said mechanism including an element arranged to move said third valve to effect withdrawal of the work from cutting position after the tool has traveled out of said work.

3. A metal cutting machine having a tool arranged to be rotated in different directions and reciprocated to travel respectively into and out of the work being cut; means for effecting the rotation and reciprocation of said tool; work holding means; means for moving said work holding means to and from cutting position; and control means regulating the travel of said tool and work comprising a longitudinally moving element, a valve whose movements effect the respective travels of said tool on its cutting and return strokes, a second valve whose opening effects the travel of said work to cutting position, a third valve whose opening effects the travel of said work from cutting position, operative connections between said valves and said element whereby upon the movement of said element in one direction the first and second mentioned valves are operated to effect simultaneously the movement of the work to cutting position and the travel of the tool on its cutting stroke, and upon the movement of the element in the opposite direction, the first said valve is initially operated to effect travel of the tool on its return stroke and subsequently the third valve is operated to effect withdrawal of the work from cutting position after the tool has left the work.

4. A metal cutting machine having a tool arranged to be rotated in different directions and reciprocated to travel respectively into and out of the work being cut; work feeding means for moving work to and from the cutting position; means effecting the movements of said work feeding means comprising a cylinder and piston; a source of pressure supply having separate connections with the ends of said cylinder; a valve in one connection adapted upon being opened to admit pressure to one end of said cylinder whereby the piston is moved to effect travel of the work to cutting position; and a second valve in the other of said connections adapted upon being opened to admit pressure to the opposite end of said cylinder whereby the piston is moved to effect travel of the work from cutting position; and means operating in synchronism with said tool for controlling the openings of said valves, whereby at the beginning of travel of the tool on its cutting stroke one of said valves is opened to effect movement of the work to cutting position, and whereby after said tool has withdrawn from said work the other of said valves is opened to effect movement of the work from cutting position.

5. A metal cutting machine having a tool arranged to travel into and out of the work to be cut; means effecting the respective travels of said tool comprising a hydraulic unit and mechanism controlling the direction of flow of liquid therethrough; a cylinder and piston for actuating said mechanism; a source of pressure supply having connection with the opposite ends of said cylinder; a valve in said connection adapted to be moved to direct the pressure to either end of the cylinder; work feeding means for moving the work to and from cutting position; means effecting the movement of said work feeding means comprising a cylinder and piston; separate connections from said source of supply to opposite ends of the last said cylinder; a valve in one of said separate connections adapted upon being opened to admit pressure to one end of the work cylinder whereby the work piston is moved to effect travel of the work to cutting position; the last said valve and the valve controlling the hydraulic mechanism being connected whereby they move simultaneously; a third valve in the other of said separate connections adapted upon being opened to admit pressure to the work piston to effect travel of the work from cutting position; and means operating in synchronism with said tool for operating all of said valves; the last said means comprising an element movable in one direction to effect simultaneous opening of the interconnected valves and thereby cause the work to be moved to cutting position and the tool to begin its cutting stroke, and movable in the reverse direction to move said hydraulic control valve to effect travel of the tool on its return stroke and subsequently to open said third valve to effect movement of the work from cutting position after the tool has been withdrawn from the work.

Signed at Providence, Rhode Island, this 12th day of August, 1929.

FAYETTE R. ELDREDGE.
GEORGE W. NEWMAN.
JOHN B. PHILLIPS.